3,781,443
PHENETHANOLAMINE N-METHYL TRANS-
FERASE INHIBITING BENZYLAMINES
Ray W. Fuller and Bryan B. Molloy, Indianapolis, Ind.,
assignors to Eli Lilly and Company, Indianapolis, Ind.
No Drawing. Filed Oct. 26, 1971, Ser. No. 192,315
Int. Cl. A61k 27/00
U.S. Cl. 424—330                                   6 Claims

ABSTRACT OF THE DISCLOSURE

The enzymatic activity of phenethanolamine N-methyl transferase (PNMT) in effecting the N-methylation of norepinephrine is inhibited by contacting the PNMT with certain benzylamines.

BACKGROUND OF THE INVENTION

Epinephrine and norepinephrine have ben known as important adrenomedullary hormones for many years. Epinephrine is secreted by the adrenals, being converted from norepinephrine by endogenous enzyme activity.

Epinephrine is formed from norepinephrine through a N-methylation step effected by an enzyme, characterized and named by Axelrod, phenethanolamine N-methyl transferase (PNMT). [Axelrod, J., J. Biol. Chem., 237 1657 (1962).]

Ordinarily there exists a physiological balance in vivo between the epinephrine and norepinephrine present. However, it has been shown that an imbalance, weighted heavily in the direction of epinephrine, exists in certain undesirable physiological conditions in animals and man. For example, where essential hypertension is present the quantity of epinephrine is high in relation to the norepinephrine. And the same observation has been made in anxiety states. Atherosclerotic deposits are increased when epinephrine is injected into rabbits, indicating that an epinephrine-norepinephrine imbalance might be a contributing cause thereof. Agents or methods effective in ameliorating the epinephrine-norepinephrine imbalance constitute useful advances in combating undesirable physiological conditions in animals and man.

SUMMARY

A class of benzylamines has now been discovered to be effective in inhibiting the enzymatic activity of PNMT in the N-methylation of norepinephrine to form epinephrine. The compounds are effective when they contact the PNMT in the presence of norepinephrine. Benzylamines with substituents such as chlorine, bromine, fluorine, iodine, methyl, trifluoromethyl, and the like attached to the benzene ring, and with substituents such as methyl, ethyl, and the like attached to the α-carbon are effective PNMT inhibitors.

DESCRIPTION OF THE PREFERRED EMBODIMENT

The compounds of the present invention are those having the following formula:

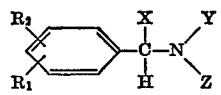

wherein, $R_1$ and $R_2$ independently are hydrogen, bromine, chlorine, fluorine, iodine, methyl, trifluoromethyl, or methoxy;

X is hydrogen, methyl, trifluoromethyl, ethyl, n-propyl, isopropyl or cyclopropyl; and Y and Z independently are hydrogen, methyl, ethyl, n-propyl, isopropyl, propargyl, allyl, cyclopropyl, t-butyl or benzyl.

Preferred compounds of the present invention are:

Benzylamine
2-bromobenzylamine
3-bromobenzylamine
4-bromobenzylamine
2-chlorobenzylamine
3-chlorobenzylamine
4-chlorobenzylamine
2-fluorobenzylamine
3-fluorobenzylamine
4-fluorobenzylamine
2-iodobenzylamine
3-iodobenzylamine
4-iodobenzylamine
2-methylbenzylamine
3-methylbenzylamine
4-methylbenzylamine
2-trifluoromethylbenzylamine
3-trifluoromethylbenzylamine
4-trifluoromethylbenzylamine
2-methoxybenzylamine
3-methoxybenzylamine
4-methoxybenzylamine
2,3-dichlorobenzylamine
3,4-dichlorobenzylamine
2,5-dichlorobenzylamine
2,4-dichlorobenzylamine
3,5-dichlorobenzylamine
2,6-dichlorobenzylamine
2,3-dimethylbenzylamine
3-chloro-N-methylbenzylamine
4-chloro-N-methylbenzylamine
2-chloro-N-methylbenzylamine
2-chloro-N-cyclopropylbenzylamine
3-chloro-N-cyclopropylbenzylamine
4-chloro-N-cyclopropylbenzylamine
2-chloro-α-methylbenzylamine
2-chloro-α-methyl-N-methylbenzylamine
4-chloro-α-methylbenzylamine
4-chloro-α-methyl-N-methylbenzylamine
α-Methylbenzylamine
α-Ethylbenzylamine
α-Trifluoromethylbenzylamine
α-Isopropylbenzylamine
α-Cyclopropylbenzylamine
α-Methyl-N-methylbenzylamine
α-Methyl-N-cyclopropylbenzylamine
N-methylbenzylamine
N-cyclopropylbenzylamine
N-propargylbenzylamine
N-ethylbenzylamine
N-isopropylbenzylamine
N-t-butylbenzylamine
N-benzylbenzylamine
N,N-dimethylbenzylamine Particularly preferred are compounds:

d-2,3-dichloro-α-methylbenzylamine
dl-2,3-dichloro-α-methylbenzylamine
2-chloro-α-methylbenzylamine
2-iodobenzylamine
3-bromobenzylamine
2,3-dichlorobenzylamine Many of the benzylamines useful in this invention are commercially available. Other benzylamines included in the class of compounds coming within the scope of this disclosure can be prepared from either an alkyl benzene, benzoic acid, benzonitrile or the appropriate phenone, as the indicated case may be, following procedures will known in the art. For example, an appropriately substituted toluene can be α-halogenated with a compound such as N-bromosuccinimide in carbon tetrachloride using benzoyl peroxide as a catalyst. The resulting product can then be reacted with an appropriate primary or secondary amine to yield one of the useful compounds of this invention. Alternatively an appropriately substituted benzoic acid can be reacted with oxalyl chloride to form the acid chloride, which is in turn reacted with an appropriate primary or secondary amine and then the amide is reduced to yield one of the amine substituted compounds of this invention.

Another route to many of the useful compounds of this invention involves the employment of an appropriately substituted phenone as the starting material. Reacting the phenone with formamide in the presence of formic acid yields the corresponding α-substituted benzylamine. Reacting the phenone with a primary or secondary amine in the presence of a catalyst, such as Raney nickel, and hydrogen yields an α-substituted amine substituted benzylamine.

Still another known method for preparing many of the compounds useful in this invention utilizes an appropriate nitrile as the starting material. For example, 3-(trifluoromethyl)benzylamine can be prepared by reacting 3-(trifluoromethyl)benzonitrile with 1 molar borane ($BH_3$) in tetrahydrofuran.

All of the benzylamines useful in this invention are preferably isolated as the hydrochloride salt. This step is accomplished by adding the crude benzylamine to a 2 N hydrochloric acid solution; evaporating the solvent, leaving the hydrochloride salt of the benzylamine as a residue; dissolving the crude product in an appropriate solvent system, such as isopropyl alcohol-ethyl acetate, and recrystallizing the benzylamine hydrochloride therefrom. However, if the benzylamine is a liquid at room temperature, it can be extracted from the reaction mixture with diethyl ether and purified by distillation in vacuo. The hydrochloride salt is then formed by conventional procedures.

EXAMPLE 1

2,3-dichloro-α-methylbenzylamine

A reaction mixture containing 136 g. (0.72 mole) of 2,3-dichloroacetophone, 162 g. (143 ml., 3.6 mole) of formamide, and 99.4 g. (81.5 ml., 2.16 mole) of formic acid was heated at 160° C. for 16 hours. The reaction mixture was then cooled to room temperature and diluted with 500 ml. of diethyl ether. The ether solution was separated, washed successively with water, 10 percent sodium carbonate and saturated sodium chloride brine, and dried over sodium sulfate. The ether was evaporated leaving an oily residue which was added to about 300 ml. of 2 N HCl and the resulting mixture was refluxed overnight. The acidic solution was extracted with chloroform until the solution was clear. The solution was then made alkaline with 1 N NaOH and the resulting alkaline solution was extracted with diethyl ether. Evaporation of the ether yielded 97 g. of a yellow liquid, which was distilled at 0.3 mm. and 85–88° C., yielding 92.5 g. of purified α-methyl-2,3-dichlorobenzylamine, the hydrochloride salt of which was prepared by conventional procedures.

It will be recognized by the skilled chemist that the benzylamines coming within the scope of this invention wherein the α-carbon is substituted will exist in both the d and l forms. Both the racemic mixture and the independent d and l forms are within the scope of this invention and are active PNMT inhibitors. The racemic mixture can be resolved into the d and l forms by conventional procedures, which involve reacting the dl-α-substituted benzylamines with an optically active acid, separating the d and l derivatives thereof by fractional crystallization, and liberating the resolved amines from their respective salts.

The effectiveness of the benzylamines described hereinbefore in inhibiting the enzymatic activity of PNMT in the conversion of L-norepinephrine to epinephrine is demonstrated in vitro by the method of Fuller and Hunt [Fuller R. W. and Hunt, J. M., Anal. Biochem, 16 (2), 349–354 (1966)].

In this procedure, 5.0 μl. of a solution comprising 0.03 m./l. of a benzylamine, coming within the scope of this invention, and 0.048 m./l. of L-norepinephrine bitartrate was combined with 10 μl. of a buffer-substrate solution prepared by mixing 25 μl. of 0.5 m. pH 7.9 sodium phosphate buffer, 55 μl. of water, 10 μl. of purified enzyme (PNMT), and 10 μl. of 300 mM. S-adenosylmethionisemethyl-$^{14}C$(SAMe-$^{14}C$), and the thus prepared incubation mixture, which contained 0.01 m./l. of the benzylamine, was incubated for 30 minutes at 37° C. The unreacted SAMe-$^{14}C$ was precipitated and the supernatant removed. The radio-activity of the supernatant was measured to determine the quantity of $^{14}C$ epinephrine formed from the enzymatically induced reaction of SAMe $^{14}C$ with L-norepinephrine. A comparison was made with a blank in which no benzylamine was present. When significant activity was observed, additional tests were carried out in which the concentration of benzylamine was as low as 0.1 μm./l. in the incubation mixture. The molar concentration of the benzylamine required to reduce the quantity of SAMe-$^{14}C$ reacted with the L-norepinphrine by 50 percent was determined. (The greater the amount of unreacted SAMe-$^{14}C$ found in the supernatant the smaller the amount reacted with the L-norepinephrine, and the greater the inhibition of the enzyme.)

The negative log of the molar concentration of the benzylamine required for 50% reduction of SAMe-$^{14}C$ reacted was determined and reported as a $pI_{50}$ value. (A $pI_{50}$ value of 6.0 represents the activity of a benzylamine having 10 times the activity of a compound with a $pI_{50}$ value of 5.0, and 100 times the activity of a compound with a $pI_{50}$ of 4.0.) It was found that a $pI_{50}$ value of 2.0 or more indicated [a benzylamine with] significant activity in inhibiting the enzymatic N-methylation of L-norepinephrine to epinephrine.

Table 1, below, shows $pI_{50}$ values determined for a number of the benzylamines useful in this invention. Column 1 lists the substituents on the benzylamine and column 2 shows the $pI_{50}$ value. The higher the $pI_{50}$ value the greater the activity of the benzylamine in inhibiting the enzymatic N-methylation of L-norepinephrine.

TABLE 1

Activity of benzylamines in inhibiting the enzymatic (PNMT) N-methylation of l-norepinephrine to epinephrine

| Benzylamine substituted with— | $pI_{50}$ value [1] |
|---|---|
| d-2,3-dichloro-α-methyl | 6.81 |
| dl-2,3-dichloro-α-methyl | 6.42 |
| 2,3-dichloro | 6.23 |
| l-2,3-dichloro-α-methyl | 5.65 |
| 3-trifluoromethyl | 5.64 |
| 2-iodo | 5.37 |
| 3-iodo | 5.30 |
| 2-chloro-α-methyl | 5.29 |

TABLE 1—Continued

| Benzylamine substituted with— | $pI_{50}$ value [1] |
|---|---|
| 4-trifluoromethyl | 5.20 |
| 3-bromo | 5.17 |
| 3-chloro | 5.07 |
| 3,4-dichloro | 4.97 |
| 2-bromo | 4.96 |
| 2,5-dichloro | 4.82 |
| 2,4-dichloro | 4.68 |
| 2-chloro-α-methyl-N-methyl | 4.67 |
| 2-chloro | 4.66 |
| 2-trifluoromethyl | 4.64 |
| 3-chloro-N-methyl | 4.59 |
| 4-iodo | 4.42 |
| 4-chloro-N-methyl | 4.39 |
| 4-bromo | 4.37 |
| 2,3-dimethyl | 4.24 |
| 2-chloro-N-methyl | 4.23 |
| 2-methyl | 4.17 |
| 2,6-dichloro | 4.08 |
| 4-chloro | 4.07 |
| 3-fluoro | 4.00 |
| 3-chloro-N-cyclopropyl | 3.97 |
| 3,4-dichloro | 3.93 |
| 2-fluoro | 3.87 |
| 3-methyl | 3.82 |
| 4-chloro-α-methyl | 3.70 |
| 4-chloro-α-methyl-N-methyl | 3.50 |
| 2-chloro-N-cyclopropyl | 3.49 |
| 4-chloro-N-cyclopropyl | 3.32 |
| 4-fluoro | 3.17 |
| α-(l)Methyl | 3.17 |
| 4-methyl | 3.16 |
| α-Methyl-N-methyl | 3.16 |
| N-cyclopropyl | 3.13 |
| None | 3.12 |
| N-methyl | 3.11 |
| N-propargyl | 3.05 |
| α-Methyl | 3.04 |
| N-ethyl | 2.86 |
| 4-methoxy | 2.78 |
| N,N-dimethyl | 2.34 |
| N-isopropyl | 2.31 |
| α-Methyl-N-cyclopropyl | 2.28 |
| α-Ethyl | 2.25 |
| α-(d)Methyl | 2.21 |
| N-t-butyl | 2.19 |

The PNMT supressing activity of dl - 2,3 - dichloro-α-methylbenzylamine hydrochloride in vivo was determined in rats. In one experiment, a sterile aqueous solution of the active benzylamine was injected intraperitoneally into groups of rate that were then forced to exercise by running for three hours in a turning squirrel cage. The drug was injected in an amount of 0.1 mM./kg. at 0 time and, 0.1 mM./kg. and 0.2 mM./kg. at one hour before the start of the exercise to separate groups of 5 rats each. Fifteen rats were injected with saline only and forced to exercise for the three hour period. In each of the groups of 5 rats receiving the active agent there was a reduction of the epinephrine and an increase in the norepinephrine content of the adrenal glands as compared to the 15 control rats receiving saline injections. The reduction in the epineprine:norepinephrine ratio indicated that dl-2,3-dichloro-α-methylbenzylamine did suppress PNMT activity in vivo.

In another experiment 0.2 mM./kg. (20.9 mg./kg.) of dl - 2,3 - dichloro - α - methylbenzylamine was injected intraperitoneally into four groups of five rats each. Fifteen control rats were injected with saline and, ½ hour post injection, were sacrificed and their adrenals pooled. The four groups of five rats each were sacrificed at ½, 1, 2 and 4 hours after administration of the active benzylamine and their adrenals removed. The adrenals were assayed for PNMT activity. There was a 53, 51, 43 and 33 percent inhibition in PNMT activity at those respective times.

Benzylamines useful in this invention are preferably administered parenterally to warm-blooded animals to inhibit the enzymatic conversion of norepinephrine to epinephrine. Parenteral preparations which are suitable for intradermal, subcutaneous, intramuscular, intraperitoneal and intravenous administrations are prepared by dissolving the benzylamine, or a physiologically acceptable salt thereof, such as the hydrochloride, phosphate, sulfate, or the like salt, in an appropriate vehicle such as water, corn oil, propylene glycol, diethylcarbonate or the like; incorporating therein a preservative such as phenol, chlorbutanol, thimerosal, or the like; sterilizing by filtration or with heat; and filling into suitable sterile containers by procedures well known to those skilled in the art.

The oral administration of the benzylamines useful in this invention can be accomplished by admixing the desired active compound with a pharmaceutically acceptable diluent such as starch, talc, microcrystalline cellulose, lactose, fumed silica or the like; granulating with partially hydrolyzed starch, sodium carboxymethylcellulose dispersions, methyl cellulose gels, or the like, and compressing the granulated particles into tablets to provide unit dosage forms according to procedures known to those skilled in the art.

Alternatively, orally administered unit dosage forms can be prepared by filling an active agent-diluent-lubricant admixture into two-piece hard gelatin capsules. It will be readily apparent to those skilled in the art that other pharmaceutical forms can be prepared for oral administration, such as granules, dragees, pellets, powders, and the like.

The parenteral or oral administration of the benzylamines useful in this invention constitutes an effective method for bringing the active agent into contact with the PNMT in the adrenals. The benzylamine enters the blood stream and is carried to the adrenals from the site of the parenteral administration, or from the gastrointestinal tract in the case of oral administration, and upon contacting the PNMT inhibits the enzymatic activity of the PNMT in methylating the norepinephrine to produce epinephrine and thus restores the normal in vivo physiological balance between the two adrenal catecholamines.

Active benzylamines coming within the scope of this invention can be administered, either orally or parenterally, to warm-blooded animals, including primates, in an amount of from about 0.1 mg./kg. of body weight to about 10.0 mg./kg. of body weight.

The administration of benzylamines, described hereinbefore, to warm-blooded animals effectively inhibits the conversion of norepinephrine to epinephrine thereby lowering the high epinephrine-norepinephrine ratio, a physiological condition associated with essential hypertension. Amelioration of the epinephrine-norephinephrine imbalance in essential hypertension is an important aspect in the treatment of this disease state.

We claim:

1. The method of reducing the phenethanolamine N-methyl transferase (PNMT) activity in the adrenal glands and concomitantly inhibiting the formation of epinephrine from norepinephrine in warm blooded animals which comprises administering to said warm blooded animals a PNMT activity-inhibiting amount of a compound of the formula

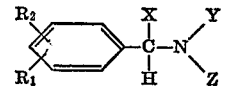

wherein, $R_1$ and $R_2$ are each independently hydrogen, bromine, chlorine, fluorine, iodine, methyl, trifluoromethyl or methoxy;

X is hydrogen, methyl, trifluoromethyl, ethyl, n-propyl, isopropyl or cyclopropyl; and Y and Z are each independently hydrogen, methyl, ethyl, n-propyl, isopropyl, propargyl, allyl, cyclopropyl, t-butyl or benzyl;

and a salt formed with a physiologically acceptable acid.

2. A method as in claim 1 wherein said compound is d-2,3-dichloro-α-methylbenzylamine.

3. A method as in claim 1 wherein said compound is dl-2,3-dichloro-α-methylbenzylamine.

4. A method as in claim 1 wherein said compound is 2-chloro-α-methylbenzylamine.

5. A method as in claim 1 wherein said compound is 3-trifluoromethylbenzylamine.

6. A method as in claim 1 wherein said compound is 2-chloro-α-methyl-N-methylbenzylamine.

References Cited
UNITED STATES PATENTS

| | | | |
|---|---|---|---|
| 3,397,277 | 8/1968 | Doebel | 424—330 |
| 3,457,354 | 7/1969 | Stone | 424—330 |

STANLEY J. FRIEDMAN, Primary Examiner